Sept. 23, 1969   W. H. LAMBERT, JR., ET AL   3,469,261
PULSE-RADAR DISTANCE-MEASURING SYSTEM
Filed Nov. 28, 1967                                        2 Sheets-Sheet 1
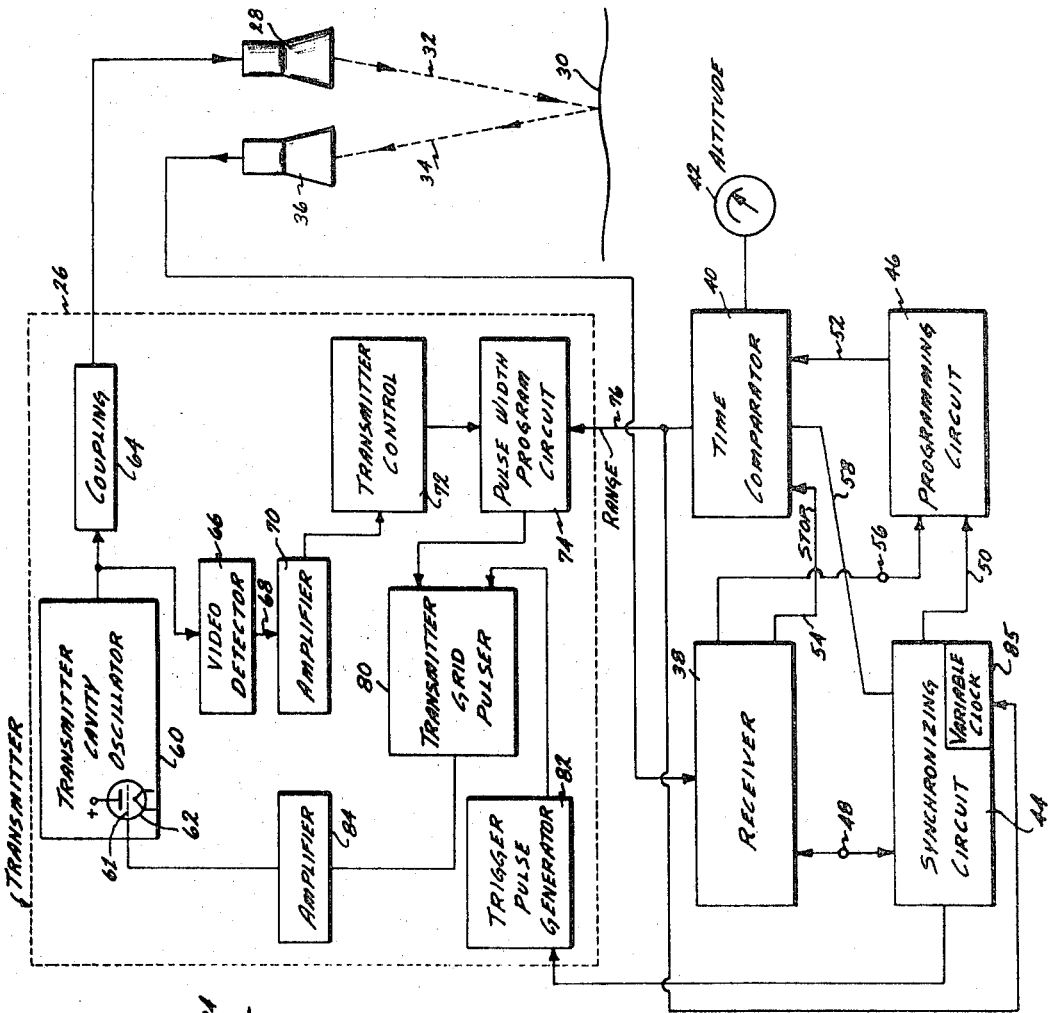
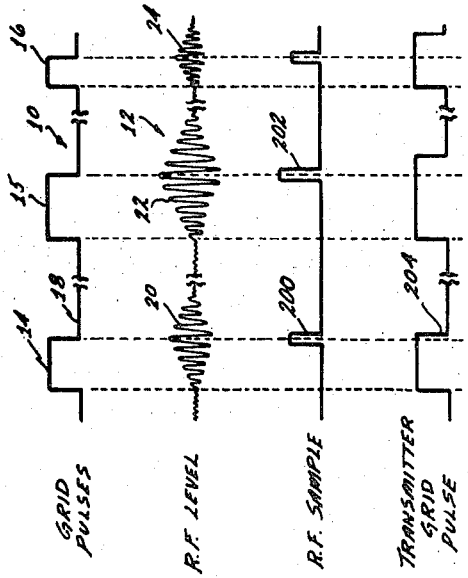
INVENTORS
WILLIAM H. LAMBERT, JR.
RICHARD J. SEGER
BY Nilsson + Robbins
ATTORNEYS

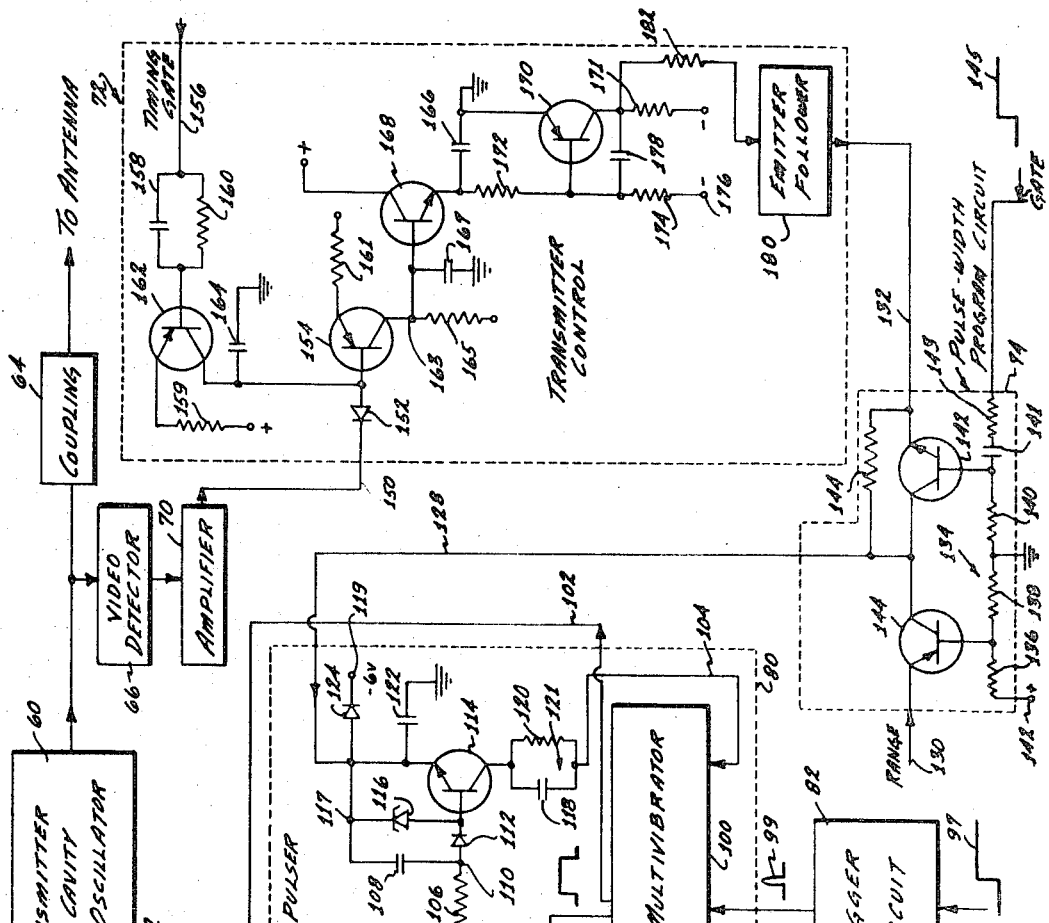

United States Patent Office 3,469,261
Patented Sept. 23, 1969

3,469,261
PULSE-RADAR DISTANCE-MEASURING SYSTEM
William H. Lambert, Jr., Northridge, and Richard J. Seger, Glendale, Calif., assignors to The Bendix Corporation, a corporation of Delaware
Filed Nov. 28, 1967, Ser. No. 686,061
Int. Cl. G01s 9/06
U.S. Cl. 343—13                10 Claims

ABSTRACT OF THE DISCLOSURE

A radar distance-measuring system is disclosed wherein pulses of traveling-wave energy are transmitted over the distance to be measured, and echoes are then sensed to indicate an interval of time which is directly related as a distance measurement. The system includes a cavity oscillator in the transmitter, and controls the amplitude and/or pulse width of the transmitted pulse on the basis of the distance to be measured by controlling the period during which the cavity oscillator is energized. Such control of the somewhat unstable cavity oscillator is accomplished by sampling the output therefrom and utilizing the resulting control signal (in combination with a signal indicative of the presently-observed distance) to control grid-pulse operation of the cavity oscillator, thereby controlling the pulse width and/or amplitude and/or pulse repetition rate of the generated RF pulse.

---

The disclosure includes a grid drive or pulsing circuit for converting a signal amplitude level to a proportionate time interval. Such a circuit is employed to grid pulse the cavity oscillator in accordance with a pulse-width program signal which is the combination of a sample control signal and a signal indicative of the presently observed distance. This control is accomplished through a gain regulation circuit having storage capability as disclosed in detail herein, and a pulse-width program circuit wherein the control pulse and the range or distance signal are additively combined to develop the program signal.

Background and summary of the invention

Radio and radar distance-measuring systems have come into rather widespread application as altimeters (replacing aneroid altimeters) to provide more accurate information on the terrain below an aircraft in flight. Improved forms of such radar altimeters are capable of providing accurate measurements of altitude as it varies from several hundred feet down to nearly zero. Such an altimeter normally utilizes several sophisticated techniques in a combined system. For example, one such system incorporates a discriminatory super-regenerative receiver, dual timing ramps, selective blanking, and altitude-related variation of the transmitted RF pulses. In controlling the width of the transmitted pulses (with reference to altitude), reduced energy is transmitted at low altitude levels thereby enabling greater selectivity insensing echoes, both with regard to time and spurious echo signals. However, at high altitudes the transmitted RF pulse is proportionately increased, to effectively travel the greater distance.

Conventionally in systems of the past, the period of the transmitted RF pulse has been controlled (with reference to altitude) by actuating the RF oscillator over a discrete interval, then gating a selected portion of the energy therefrom during controlled intervals, which is related to current altitude. Although systems of this type have been widely used and are quite effective, there are attendant disadvantages. Specifically, for example, these systems are somewhat inefficient in that only a relatively small portion of the total RF energy actually developed is transmitted at low altitudes. Furthermore, the dissipation and confinement of the unused RF energy sometimes presents problems that are difficult to solve, particularly in using the system in a sophisticated highly-instrumented aircraft.

In the development and design of prior radar altimeters, it may have been recognized that advantageous operation would result from controlled keying of the RF oscillator, rather than employing the conventional technique of pulsing the oscillator to operate over relatively-long intervals and selectively gating a portion of the energy for transmission. However, RF oscillators e.g. cavity oscillators, for generating effective traveling-wave energy, are not conventionally subject to precise-controlled operation. In this regard, similar cavity oscillators of a particular type are likely to exhibit substantial variation even though they are manufactured to very close tolerance standards. Additionally, various environmental factors, as temperature changes, tend to alter the operating characteristics of cavity oscillators. Therefore, as indicated, the past solution to the problem of providing a variable interval of RF energy has been to operate the oscillator for a period coinciding to the maximum desired interval, then to key a portion of the output therefrom to provide the desired pulse for transmission. In spite of the attendant disadvantages of such an operating system, alternatives were neither apparent nor obvious to workers in the art, and as a result a substantial number of units have been manufactured and used incorporating the gated RF pulse technique.

In general, the present invention resides in the discovery that the RF oscillator of a radar altimeter can be accurately controlled to operate for selectively-variable intervals of time, as related to altitude. The selective control is accomplished by driving the oscillator with variable width pulses which are formed to include information indicative of the instant operating characteristics of the oscillator. That is, the operation of the oscillator is sensed by sampling the output therefrom to provide a control signal which is stored for future use in controlling the oscillator. By incorporating such control along with a variable range-amplitude control system, signals are developed for effectively controlling the RF oscillator, thereby avoiding inefficient and troublesome gated RF techniques as widely employed in the past.

Brief description of the drawings

In the drawings, which constitute a part of this specification, an exemplary embodiment demonstrating various objectives and features hereof is set forth, specifically:

FIGURE 1 is a time-sequence diagram illustrative of the operation of the disclosed embodiment;

FIGURE 2 is a block diagram of an altimeter constructed in accordance with the present invention;

FIGURE 3 is a time-sequence diagram further illustrative of the disclosed embodiment of FIGURE 2; and FIGURE 4 is a block and somewhat schematic diagram of a portion of the system of FIGURE 2.

Description of the illustrative embodiment

Preliminary to a structural consideration of the disclosed embodiment, reference will be made to FIGURE 1 in conjunction with a brief consideration of certain operating characteristics of an RF oscillator, e.g. a cavity-type oscillator designed for operation in the 4,000 megacycle range as may be embodied in the system hereof. Such oscillators may be constructed for grid pulse operation. However, when such an oscillator is pulsed, its initial operation starts at a very low level of amplitude and gradually builds up over a discrete interval of time. The actual rate of build-up is subject to substantial variation between different tubes of identical type, as well as certain environmental conditions, as temperature.

In a pattern somewhat similar to the oscillator's initial period of operation, when the grid pulse is terminated, the oscillator does not immediately stop oscillating, but rather the oscillations define a gradually attenuated pattern again over a discrete time interval. This characteristic of RF oscillators is illustrated in waveforms 10 and 12 of FIGURE 1. Specifically, the waveform 10 illustrates oscillator grid pulses 14, 15 and 16 on a reference-level time base 18.

The waveform 12 illustrates three intervals of RF oscillation, specifically RF pulses 20, 22 and 24 and is associated in time with the waveform 10. It is to be noted, in each case of generating an RF pulse, the leading edges of the grid pulses 14, 15 and 16 initiate a period when the RF oscillation begins to increase in amplitude. Somewhat similarly, the trailing edges of the grid pulses 14, 15 and 16 mark the start of a period of attenuated oscillation in the related RF pulses 20, 22 and 24. Thus, when the oscillator is pulsed it begins to oscillate at increased amplitude, providing an output of increasing amplitude. Then, on termination of the grid pulse, the oscillator continues to provide an output, however, one which gradually attenuates to an insignificant level of amplitude.

As indicated, the rates of build-up and attenuation are subject to substantial variation between identical type tubes and with changes in environmental conditions. In spite of such variation, the system hereof accomplishes reliable operation as described below in detail, by sampling the output of the RF oscillator, and storing the resulting sample for future control of the oscillator.

Considering the system hereof in general, a transmitter 26 (FIGURE 2) provides a pulse or burst of RF energy to a transmitting antenna 28. As a result a wave of traveling enregy passes to an object, e.g. ground 30 as indicated by a dashed line 32. Of course, reflections from the ground 30 emanate in many directions: however, the echo of concern is indicated by a dashed line 34 and is sensed by a receiving antenna 36 for application (as an electrical signal) to a receiver 38.

Generally, as well known in pulse-echo radar systems, the operation of the present system involves measuring the interval between the instant when a pulse is transmitted by the antenna 28 and the instant when a pulse is transmited by the antenna 28 and the instant when an echo is received by the antenna 36. As the propagation sneed of the pulse and the echo are known (and constant) the measured interval may be directly related to the travelled distance. In the system of FIGURE 2, the interval is sensed or determined in a time-comparator 40 to provide an electrical signal to a meter 42, which manifests distance or altitude.

The operation of the system, as shown in FIGURE 2, is synchronized and programmed by a synchronizing circuit 44 and a programming circuit 46. Specifically, the synchronizing circuit 44 establishes the basic pulse rate frequency of the system and additionally provides timing signals for the tracking operation as well as to afford dummy transmissions and receptions to accomplish control signals for regulating operating levels within the system.

The synchronizing circuit 44 is connected to the receiver 38 through a cable 48 and is also connected to the programming circuit 46 through a conductor 50. The programming circuit 46 initiates the operation of a distance-measuring interval by providing a signal to the time comparator 40 through a conductor 52. Subsequently, when an echo is received, the receiver 38 provides a stop-timing signal to the time comparator 40 through a conductor 54. The programming circuit 46 also functions to time the operation of the system and in this regard it is connected through a cable 56 to the receiver 38. Subsequent to each operating cycle of this system, the time comparator 40 is reset by a reset signal supplied through a conductor 58 from the synchronizing circuit 44.

The novelty of the system of FIGURE 1 is deemed to reside primarily in the transmitter 26 in combination with the other well-known components. In this regard, the other components of the system are disclosed in detail and their operation is explained in United States Patent 3,309,703, issued Mar. 14, 1967 to Ammon et al. Thus, the detailed disclosure of the Ammon et al. patent includes structural apparatus readily usable for elements herein, including the receiver 38, the time comparator 40, the synchronizing circuit 44 and the programming circuit 46.

Considering the transmitter 26 in somewhat greater detail, a cavity-type oscillator 60 is employed as a source of RF enregy, e.g. 4,300 megacycles. As indicated, the cavity oscillator is driven at the RF frequency as well known in the prior art and is keyed into effective oscillation by the control grid 61 of a triode 62 forming a part of the cavity oscillator 60.

The output of the cavity oscillator 60 is applied to the transmitting antenna 28 through a coupling 64 as generally well known in the radar art. The output from the oscillator 60 is also applied to a video detector 66 to provide a sample of the oscillator output from which a control signal is developed, stored and eventually applied to control operation of the oscillator 62.

The video detector 66 may comprise a diode, as conventionally employed and functions to develop a video signal in a conductor 68 for application to a video amplifier 70 which may incorporate a pulse shaper. The video signal from the amplifier 70 (which is a sample of the output from the oscillator 60) is applied to a transmitter control circuit 72 which registers the video signal sample to develop an operating level or gain control signal for regulating the operation of the oscillator 60. That is, the circuit 72 provides a control signal to a pulse-width program circuit 74 which also receives a range altitude signal through a conductor 76 from the time comparator 40. Thus, information representative of past operation of the oscillator 60 is combined with information indicative of current range or altitude to formulate a program signal within the circuit 74 for transmission through a conductor 78 to a transmitter grid pulser circuit 80.

The grid pulser circuit 80 also receives a start signal or trigger from a pulse generator 82 which is driven by the synchronizing circuit 44. In general, the trigger or pulse generator 82 provides a short-duration pulse commanding the grid pulser 80 to initiate a time-modulated control pulse for passage through an amplifier 84 to the grid 61 of the triode 62. The pulser 80 then continues to pulse the oscillator 60 for a particular interval determined by the amplitude of the program signal received from the program circuit 74 through the conductor 78. Thus, the operating interval of the oscillator 60 is regulated in accordance with: (1) recent past operating history and (2) current operating range or altitude.

In the system as shown in FIGURE 1, distinct cyclic intervals (separate from the actual tracking interval), are provided to establish operating levels for the receiver 38 and the transmitter 26. That is, in one operating embodiment hereof, the mean or nominal repetition rate is some 500 microseconds, which interval includes a tracking period (during which the observed distance is measured) a transmitter control period (during which a level of operation for the transmitter is developed) and a receiver AGS operating interval (during which the automatic gain level for the receiver is established). These distinct intervals are illustratively indicated in FIGURE 3 showing certain timing signals, which are derived in the synchronizing circuit 44 (FIGURE 2).

The synchronizing circuit 44 incorporates a variable clock generator 85 as well known in the prior art for providing synchronizing or clock pulses 83 as indicated in a waveform 84 (FIGURE 3). In one operating embodiment hereof, the clock has a nominal period of 125 microseconds, which is varied as a function of the current distance measurement. To accomplish this variation, the range signal in conductor 76 is applied to the clock 85, which may comprise any of a wide variety of variable oscillator circuits as well known in the prior art. In this regard, as the distance increases, the amplitude of the range signal increases, and the frequency of the clock signal is decreased. In addition to the clock 85, the synchronizing circuit 44 incorporates a PRF generator for providing a cyclic timing signal as indicated by the waveform 86. Again, considering an operating embodiment hereof, a cycle or period of the PRF generator of 500 microseconds has been found effective.

As illustrated in FIGURE 3, certain other timing signals are developed, specifically including a tracking gate (waveform 88), a transmitter sampling signal (waveform 90), and a receiver AGS gate signal (waveform 93).

Detailed identification of circuits for providing the waveform 86 are provided in the above referenced Patent 3,309,703. Additionally, clock generators as may be used for the clock 84 are very well known in the prior art. Furthermore, the development of timing signals in accordance with desired objectives from a basic clock signal and a PRF signal are very well known and therefore not illustrated or explained in detail.

The system also develops spaced apart transmitter grid pulses as depicted in waveform 89 a time form of which is shown by the waveform 10 in FIGURE 1. A correlation to the transmitter grid pulses of the waveform 89 is indicated in a waveform 91 illustrating echo pulses 92. In this regard, the periods of time existing between the transmitter grid pulses indicated in waveform 89 and the echo pulses 92, indicate the distance observed.

The detailed structure and operation of the receiver AGS system incorporated in the receiver 38 (FIGURE 2) is illustrated and described in the above referenced Patent 3,309,703. Similarly, the detailed structure operative in sensing and processing the echo pulses 92 for the development of a range signal indicative of distance is as shown and described in that above-reference patent. However, the detailed structure which functions during the interval for transmitter control level is deemed novel to the present system and is illustrated in FIGURE 4 as described below.

FIGURE 4 is a detailed illustration of the transmitter 26 as shown in FIGURE 2. In this regard, components of the system of FIGURE 4 which were previously identified with reference to FIGURE 2 carry similar reference numerals. Furthermore, certain components which are either very well known in the prior art or were disclosed in detail in the above-referenced Patent 3,309,703 are represented in block form in the system of FIGURE 4.

Recapitulating, in the transmitter, the grid pulser 80 provides a pulse to the oscillator 60 of varying width depending upon sampled and stored control information. In this regard, the trigger circuit 82 is actuated by a signal 97 each time the transmitter is to be operated. Therefore, at the start of operation, the leading edge of the signal 97 applied to the trigger circuit 82 results in the production of a pulse 99 which is in turn applied to a multivibrator 100.

Functionally, the multivibrator 100 is set by the pulse 99 from the trigger circuit 82 and remains set for a variable period during which a grid drive pulse 14 (FIGURE 1) is supplied through a conductor 102 (FIGURE 4) to energize the oscillator 60. The grid drive pulse, as indicated above, may be of various durations, as depicted in wavefore 10 (FIGURE 1).

To conclude the grid drive pulse, the multivibrator 100 (FIGURE 4) is reset through a conductor 102 in a manner which will now be considered in detail.

The timed interval of the multivibrator 100, as in the grid pulser 80 is dependent upon the potential applied at the emitter of a transistor 114. Generally, that potential is a charge stored across a capacitor 122 and is limited to potentials below a slightly-negative voltage by a diode 124 that is connected to a negatively-biased terminal 126. The capacitor 122 is charged through an input conductor 128 connecting the grid pulser 80 to the pulse-width program circuit 74. Thus, in accordance with the program signal received by the grid pulser 80 and developed by the program circuit 74, the interval of the oscillator 60 is controlled.

More specifically, when the multivibrator 100 is set by the pulse 99 from the trigger circuit 82, the multivibrator provides current through a resistor 106 to a capacitor 108, forming a ramp voltage at a junction point 110 between these components. The capacitor 108 is terminated at a junction 117, which is connected: to the emitter of the transistor 114, to the capacitor 122 and through a diode 124 to a level-control potential applied at a terminal 119. The junction point 110 is connected through a diode 112 to the base of the transistor 114, which is also coupled through a tunnel diode 116 to the junction 117.

In operation, when the ramp at the junction point 110 rises sufficiently (discharging the capacitor 122) to operate the tunnel diode in the negative-resistance region, the potential across the diode suddenly increases, to rapidly turn on the transistor 114.

The time delay between the instant of triggering the multivibrator 100 and the instant when the transistor 114 is turned on, is thus a function of the charge on the capacitor 122. That is, the ramp at the anode of the diode 116 starts at a substantially-negative point and rises until it overcomes the reverse bias on that diode to turn on the transistor 114.

The negative going signal at the collector of the transistor 114 is coupled through a parallel circuit 121 (including a capacitor 118 and a resistor 120) to the conductor 104 through which the multivibrator 100 is reset. Thus, when the transistor 114 is turned on, the multivibrator 100 is reset halting the application of positive potential to the resistor 106 and terminating the drive pulse through the conducor 102. The operation of resetting the multivibrator 100 cuts off the transistor 114 returning the circuit to its quiescent state.

The controlling charge developed on the capacitor 122 in the grid pulser 80 is provided during gated intervals through a pulse-width program circuit 74. That is, the amplitude-modulated program signal is developed by the program circuit 74 to establish a charge on the capacitor 122 which in turn determines the operating period of the oscillator 60. The amplitude of the signal developed by the pulse width program circuit 74 in turn is dependent upon two distinctly-separate inputs. Specifically, the program circuit 74 receives the range signal through a conductor 130 which is indicative of the present operating altitude or the distance under observation. Additionally the program circuit also receives an input through conductor 132 in the form of a control signal indicative of the recent past operation of the transmitter cavity oscillator 60. Functionally, the program circuit 74 somewhat algebraically combines the two received signals to provide the output program signal, the amplitude of which indicates and controls the operating interval of the transmitter cavity oscillator 60.

In the operation of the program circuit 74, a voltage divider 134 establishes the altitude at which the range signal becomes significant, and includes resistors 136 and 138 serially connected along with a resistor 140. The resistor 140 is in turn connected to the base of a transistor 142 and through a series-connected capacitor 141 and resistor 143, for coupling to receive gate pulses 145. The gate input to the circuit controls the operation thereof to intermittently drive the grid pulser with the amplitude-modulated control signal.

Again, considering the voltage divider 134, the other end is connected to a source of positive potential applied at the terminal 142. The junction point between the resistors 138 and 140 is connected to ground potential, while the junction point between the resistors 136 and 138 is connected to the base of a transistor 144. The emitter of the transistor 144 is directly connected to receive the range signal through the conductor 130 while the emitter of the transistor 142 is connected to receive a control signal through a conductor 132 from the control unit 72.

The collector of both the transistors 142 and 144 are connected to the input conductor 128 of the grid pulser 80. As explained below, the conductor 128 receives a signal which is amplitude related to the range signal (carried in the conductor 130) and the control signal (received in the conductor 132).

In the operation of the circuit, when the gate 145 is positive, the transistor 142 conductors and the control signal is applied through the transistor 142 and the conductor 128 to the pulser 80. However, when the gate signal 145 is low, or negative, the transistor 142 is cut off leaving only a resistor 144 as the path for the control signal to the pulser 80. Additional current from the collector of the transistor 144 causes the pulse width program signal to become more positive, when the transistor 142 is cut off, resulting in wider or longer duration grid pulses for the oscillator. The collector current of the transistor 144 varies as the range signal.

The range input to the program circuit 74 is the altitude-indicating signal, developed from recently past cycles of operation. However, the control signal received by the program circuit 74 through the conductor 132 is directly related to the amplitude of the output from the transmitter, as sampled during recent intervals of operation. Considering the detailed development of the control signal carried in the conductor 132, reference will now be made to the transmitter control circuit 72 which receives an amplified sample of the video signal from the detector 66, through the amplifier 70 as explained above.

The transmitter control circuit 72 essentially integrates samples of the output from the oscillator 60 to provide a level of control which will compensate for temperature-related and other changes in the characteristics of the transmitter cavity oscillator 60. Specifically, the sample video signal, received in the control circuit 72 from the amplifier 70 passes through a conductor 150 and a diode 152 for application to the base of a transistor 154. It is to be noted that the applied pulse is negative and that the diode 152 is connected accordingly.

During the interval of transmitter control, as indicated by the pulse in the waveform 90 (FIGURE 3) a transmitter control timing signal is positive and is applied to the control circuit 72 through a conductor 156. The timing signal is then applied through a parallel coupling circuit (including a capacitor 158 and a resistor 160) to the base of a transistor 162. The emitter of the transistor 162 is connected through a resistor 159 to a source of positive potential while the collector of the transistor is connected directly to the base of the transistor 154. A capacitor 164 is connected between the collector of the transistor 162 and ground potential.

When the gating or timing signal applied to the transistor 162 is positive, the transistor is cut off and the capacitor 164 assumes a potential equal to a DC bias level, less the peak value of the amplified video pulse received through the diode 152. The capacitor 164 retains this potential level until the potential in the conductor 156 becomes negative, thereby causing the transistor 162 to conduct. The negative going square wave thus developed across the capacitor 164 is then applied to a capacitor 166 through the transistor 154 and a transistor 168 with the result that the potential is inverted and the capacitor 166 stores the pulse peak signal. In this regard, the transistors 154 and 168 function basically as amplifiers in which function, the transistor 154 is emitter biased through a resistor 161, the junction 163 between the collector of transistor 154 and the base of transistor 168 is biased through a resistor 165 and shunted to ground potential through a capacitor 167.

Charged through the amplifiers embodying transistors 154 and 168, the capacitor 166 drives the base of a transistor 170 which functions as an integrator for developing a steady-state output signal. That is, the current derived from the potential across the capacitor 166 passes through a resistor 172 to the base of the transistor 170 and is balanced by the current passing through a resistor 174 from a source of negative potential applied at a terminal 176. A change in the amplitude of the video pulse or sample control signal therefore causes a corresponding change in the potential across the capacitor 166, thereby forcing the amplifier of the transistor 170 (collector biased through a resistor 171) to charge or discharge the capacitor 178 accordingly. The current required to charge or discharge the capacitor 178 just balances the change of current through the resistor 172 to develop the control signal.

The control signal voltage at the collector of the transistor 170 is applied to an emitter folower 180 through a resistor 182, for provision of a stable continuous signal to the program circuit 74 through the conductor 132.

As indicated above, when the potential from the emitter follower 180 drops, the effect is to reduce the period during which the oscillator 60 is pulsed thereby developing a lower-amplitude video pulse as explained above with respect to FIGURE 1. Upon occurrence of a lower potential across the capacitor 166, the output to the conductor 132 becomes less negative thereby establishing a feedback-like arrangement for stabilization and consistency in the operation of the cavity oscillator 60.

Recapitulating with regard to the transmitter system as fully depicted in FIGURE 4, the cavity oscillator 60 is subject to considerable variation in operation. Therefore, the output therefrom is sampled by the video detector 66, to provide a signal which is amplified by the amplifier 70 and processed by the transmitter control circuit 72 which formulates an integrated potential level indicative of the recent operating history of the cavity oscillator 60. That signal is algebraically combined with the range signal in the program circuit 74 to provide a pulse program signal to establish the period during which the cavity oscillator 60 is to be pulsed. The amplifier-significance of the pulse program signal is converted to a period of grid pulsing by the grid pulser circuit 80 which functions to control the transmitter cavity oscillator 60.

Summarizing the cyclic operation of the system, assume that a grid pulse 14 (FIGURE 1) accomplishes an oscillation burst or RF pulse 20, which is sampled as a discrete amplitude indicated by a level pulse 200. Assume further that the amplitude of the sample indicated by the pulse 200 is below the desired level. As a result, the pulse width program signal is increased in amplitude, the grid pulser provides a pulse 15 of longer duration and the transmitted pulse 22 is of greater amplitude. The amplitude may, in fact, be too great, resulting in an increased sample level pulse 202 to impose the reverse corrective sequence as indicated.

The grid pulses of waveform 10 thus illustrate correction at a single altitude. However, in the event of altitude changes the grid pulses are altered. Specifically, for example, the waveform 204 represents a pattern similar to that of waveform 10, modified by a substantial increase in altitude to accomplish progressively longer grid pulses.

Thus, a system of grid-pulsed cavity oscillator operation is provided which affords positive control of the cavity oscillator so that substantialy only usable RF energy is developed. That is, the cavity osciialtor 60 is controlled rather than gating the output therefrom. As a result, considerable economy results not only in power consumption but additionally in the production of system because considerably less shielding and isolation structure is required. As indicated, the capability of operating the controlled cavity oscillator stems basically from the sampling circuit which observes the output of the cavity oscillator over a period of operation and accordingly adjusts a registered signal to preserve and control the desired amplitude. Such a circuit or system of control has been found capable of stabilizing the oscillator whereby to accomplish substantially-improved operation of the entire radar system as depicted in FIGURE 1.

Of course, as indicated above, the system hereof may be readily adapted to provide a wide variety of different distance-measuring structures or embodiments and may be readily adapted for incorporation in a wide variety of different systems; therefore, the illustrative structure disclosed herein is deemed merely exemplary of this development, the scope of which shall be determined not from examples herein but in accordance with the claims set forth below.

What is claimed is:

1. A pulse-echo distance-measuring system wherein pulses of traveling wave energy are transmitted and echoes therefrom are sensed, comprising:
   transmitter means including an RF oscillator, for transmitting said pulses;
   means for sampling said pulses at said transmitter means to provide a control signal indicative of the amplitude of said pulses;
   means for repeatedly energizing said transmitter means to provide said pulses for controlled time intervals;
   means for varying said controlled time intervals in accordance with said control signal; and
   means for sensing said echoes from said pulses to provide an indication of distance, as a distance signal.

2. A distance-measuring system according to claim 1, wherein said transmitter means includes cavity oscillator means and an antenna means, and wherein said means for sampling is connected between said cavity oscillator means and said antenna means.

3. A distance-measuring system according to claim 2, wherein said means for sampling includes a video detector for manifesting the amplitude of said pulses.

4. A distance-measuring system according to claim 2, wherein said cavity oscillator means includes a grid tube and wherein said controlled time interval during which said cavity oscillator means provides a pulse, is controlled by pulsing the grid of said grid tube.

5. A distance-measuring system according to claim 1, further including means for varying said controlled time interval in accordance with the indication of distance provided by said means for sensing.

6. A distance-measuring system according to claim 2, wherein said means for varying said controlled time interval includes a bistable apparatus for providing a pulse-duration signal; means for setting said bistable apparatus in one state to initiate said time interval; and means for setting said bistable apparatus in another state after an interval proportionate the amplitude of said control signal.

7. A distance-measuring system according to claim 6, further including means for varying said controlled time interval in accordance with the indication of distance provided by said means for sensing.

8. A distance-measuring system according to claim 6, wherein said means for setting said bistable apparatus in another state includes: means for initiating a time-amplitude related signal on setting said bistable apparatus in said one state and means for sensing an instant of amplitude-related coincidence between said time-amplitude related signal and said control signal whereby to set said bistable apparatus in said other state.

9. A distance-measuring system according to claim 8, further including means for varying said controlled time interval in accordance with the indication of distance provided by said means for sensing.

10. A distance-measuring system according to claim 1, further including means for varying the interval of time between said pulses from said transmitter with said distance signal.

References Cited

UNITED STATES PATENTS

| | | | |
|---|---|---|---|
| 2,981,942 | 4/1961 | Gross | 343—13 XR |
| 2,981,943 | 4/1961 | Dodington | 343—7.5 |
| 3,202,988 | 8/1965 | Fombonne | 343—13 |
| 3,258,769 | 6/1966 | Forestier | 343—13 XR |
| 3,308,459 | 3/1967 | Carlsson et al. | 343—13 |
| 3,309,703 | 3/1967 | Ammon et al. | 343—13 |
| 3,381,292 | 4/1968 | Hansen | 343—7.5 XR |

RODNEY D. BENNETT, JR., Primary Examiner

JEFFREY P. MORRIS, Assistant Examiner